(12) United States Patent
Siomina et al.

(10) Patent No.: US 9,596,042 B2
(45) Date of Patent: Mar. 14, 2017

(54) METHODS OF PERFORMING INTER-FREQUENCY MEASUREMENTS IN THE IDLE STATE

(71) Applicant: Telefonaktiebolaget L M Ericsson (publ), Stockholm (SE)

(72) Inventors: Iana Siomina, Täby (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/782,047

(22) PCT Filed: Sep. 27, 2013

(86) PCT No.: PCT/SE2013/051123
§ 371 (c)(1),
(2) Date: Oct. 2, 2015

(87) PCT Pub. No.: WO2014/168539
PCT Pub. Date: Oct. 16, 2014

(65) Prior Publication Data
US 2016/0036541 A1    Feb. 4, 2016

Related U.S. Application Data

(60) Provisional application No. 61/809,455, filed on Apr. 8, 2013.

(51) Int. Cl.
*H04W 24/10*    (2009.01)
*H04B 17/345*    (2015.01)

(52) U.S. Cl.
CPC .......... *H04B 17/345* (2015.01); *H04W 24/10* (2013.01)

(58) Field of Classification Search
None
See application file for complete search history.

(56) References Cited

U.S. PATENT DOCUMENTS

2010/0234040 A1    9/2010  Palanki et al.
2012/0106472 A1    5/2012  Rosa et al.
(Continued)

FOREIGN PATENT DOCUMENTS

EP          1320212 A2      6/2003
WO     2009068727 A1      6/2009
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); User Equipment (UE) radio transmission and reception (Release 11)", Technical Specification, 3GPP TS 36.101 V11.4.0, Mar. 1, 2013, pp. 1-401, 3GPP, France.

(Continued)

*Primary Examiner* — Diane Mizrahi
(74) *Attorney, Agent, or Firm* — Coats & Bennett, P.L.L.C.

(57) ABSTRACT

The disclosure relates to inter-frequency measurement and cell search techniques in scenarios where two neighboring base stations transmit on different carrier frequencies having bandwidths that overlap at least in part. A wireless terminal samples a baseband signal to perform an estimation or a measurement on a serving carrier frequency. The samples may be used also to perform an estimation or a measurement, or to performs a cell search, on an inter-frequency carrier.

32 Claims, 9 Drawing Sheets

(56) References Cited

U.S. PATENT DOCUMENTS

| | | | |
|---|---|---|---|
| 2013/0235837 A1 | 9/2013 | Suo | |
| 2013/0308481 A1* | 11/2013 | Kazmi | H04W 24/02 370/252 |
| 2014/0119265 A1* | 5/2014 | Shauh | H04W 4/06 370/312 |
| 2014/0146732 A1* | 5/2014 | Olufunmilola | H04W 24/10 370/311 |
| 2014/0185495 A1 | 7/2014 | Kuchibhotla et al. | |
| 2014/0185530 A1 | 7/2014 | Kuchibhotla et al. | |
| 2014/0334294 A1* | 11/2014 | Ericson | H04W 16/14 370/229 |
| 2016/0029379 A1 | 1/2016 | Kuchibhotla et al. | |
| 2016/0057708 A1* | 2/2016 | Siomina | H04W 52/243 455/452.2 |

FOREIGN PATENT DOCUMENTS

| | | |
|---|---|---|
| WO | 2012065538 A1 | 5/2012 |
| WO | 2013048302 A1 | 4/2013 |
| WO | 2014168538 A1 | 10/2014 |

OTHER PUBLICATIONS

3rd Generation Partnership Project, "3rd Generation Partnership Project; Technical Specification Group Radio Access Network; Evolved Universal Terrestrial Radio Access (E-UTRA); Requirements for support of radio resource management (Release 11)", Technical Specification, 3GPP TS 36.133 V11.4.0, Mar. 1, 2013, pp. 1-676, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.5.0, Mar. 2013. 3GPP, France.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 11)", Technical Specification, 3GPP TS 36.304 V11.3.0, Mar. 2013. 3GPP, France.

3rd Generation Partnership Project, "3rd Generation Partnership Project; Technical Specification Group Radio Access Network; Evolved Universal Terrestrial Radio Access (E-UTRA); Physical layer; Measurements (Release 11)", Technical Specification, 3GPP TS 36.214 V11.1.0, Dec. 2012. 3GPP, France.

3rd Generation Partnership Project, "3rd Generation Partnership Project; Technical Specification Group Radio Access Network; User Equipment (UE) radio transmission and reception (FDD) (Release 11)", Technical Specification, 3GPP TS 25.101 V11.5.0, Mar. 2013. 3GPP, France.

* cited by examiner

METHODS OF PERFORMING INTER-FREQUENCY MEASUREMENTS IN THE IDLE STATE

TECHNICAL FIELD

The present disclosure relates to wireless communication networks and, more particularly, to networks where the transmission bandwidth of a strong inter-frequency interferer overlaps with a receiver bandwidth.

BACKGROUND

In Third Generation Partnership Project (3GPP) standards, heterogeneous network deployments have been defined as deployments where base stations of different transmit powers are placed throughout a macro-cell layout. Examples of low-power base stations include micro, pico, and femto base stations. Heterogeneous network deployments provide capacity extension in certain areas such as traffic hotspots. A traffic hotspot is a small geographical area with a higher user density and/or higher traffic intensity than the surrounding area. Placing a low power base station such as a pico base station at a traffic hotspot can adapt a network according to traffic needs and environment, thus enhancing the network's performance. However, interference characteristics in a heterogeneous deployment are significantly different than in a homogeneous deployment, in both downlink and uplink. Also in a heterogeneous network deployment, traffic distribution is often non-uniform and uplink transmissions generally experience high interference due to the co-existence of both small and large cells.

It is often challenging to ensure efficient network operation and superior user experience in a heterogeneous network deployment. One common problem related to heterogeneous networks is that it is often difficult for a wireless device to perform measurements on signals transmitted from a low-power base station in a heterogeneous network due to interference from neighboring high-power base stations. Yet accurate signal estimates and measurements are needed for important functionalities such as cell search, cell identification, handover, Radio Link Management (RLM) and Radio Resource Management (RRM), etc. The difficulty of the measurements is compounded in scenarios where cells providing overlapping coverage operate on different carrier frequencies.

SUMMARY

The disclosure relates to inter-frequency measurement and cell search techniques in scenarios where two neighboring base stations transmit on different carrier frequencies having bandwidths that overlap at least in part. A wireless terminal samples a baseband signal to perform an estimation or a measurement on a serving carrier frequency. The samples may be used also to perform an estimation or a measurement, or to performs a cell search, on an inter-frequency carrier.

Exemplary embodiments of the disclosure comprise methods performed by a wireless terminal in a wireless communication network. In one embodiment of the method, the wireless terminal obtains, during an idle mode, samples of first signals received on a first carrier frequency having a first bandwidth; determines that a second carrier frequency different from the first carrier frequency has a second bandwidth that overlaps, at least in part, with the first bandwidth of the first carrier frequency; and performs, during said idle mode, inter-frequency measurements on one or more second signals transmitted on the second carrier frequency using the samples of the first signals transmitted on the first carrier frequency.

In some embodiments, the second carrier frequency partially overlaps the first carrier frequency and the inter-frequency measurements span a portion of the second bandwidth that overlaps the first bandwidth.

In some embodiments, the second carrier frequency fully overlaps the first carrier frequency said inter-frequency measurements span the entirety of the second bandwidth.

In some embodiments, the method further comprises performing, during said idle mode, intra-frequency measurements on one or more of the first signals using said samples.

In some embodiments, the first carrier frequency is a serving carrier frequency.

In some embodiments, the method further comprises sending to a network node a measurement report including inter-frequency measurements made on the second carrier frequency.

In some embodiments, the measurement report indicates that the inter-frequency measurements span a portion only of the second bandwidth.

In some embodiments, the measurement report includes an indication of the portion of the second bandwidth on which the measurements where performed.

In some embodiments, the method further comprises cancelling interference due to the second signals from said samples to obtain reduced interference samples; and performing measurements on the first signals using the reduced interference samples.

In some embodiments, cancelling interference due to the second signals from said samples to obtain reduced interference samples comprises performing frequency correction on the samples to adjust the samples to a frequency grid associated with the second carrier frequency; estimating the second signals; transforming the estimated second signal to corresponding signals on a frequency grid associated with the first carrier frequency; and subtracting the transformed signal from the received samples of the first signal.

In some embodiments, the method further comprises cancelling interference due to the first signals from said samples to obtain reduced interference samples; and performing measurements on the second signals using the reduced interference samples.

In some embodiments, the method further comprises performing frequency correction on the samples to adjust the samples to a frequency grid associated with the second carrier frequency.

In some embodiments, the inter-frequency measurements are performed during a discontinuous reception (DRX) activity period.

In some embodiments, the method further comprises signaling, to another network node, a capability of performing inter-frequency measurements for the second signals within a portion of the second bandwidth that overlaps with the first bandwidth.

In some embodiments, the method further comprises adapting measurement parameters for said inter-frequency measurements.

In some embodiments, adapting measurement parameters for said inter-frequency measurements comprises adapting a bandwidth and/or filter length of a measurement filter.

In some embodiments, the method further comprises scaling the estimated or measured parameter depending on the measurement bandwidth.

Other embodiments of the disclosure comprise a wireless terminal adapted to perform inter-frequency measurements in idle mode. In one embodiment, the wireless terminal comprises a transceiver circuit for communication with network nodes in a wireless communication, and a processing circuit (420) to process received signals received via said transceiver circuits. The processing circuit being configured to obtain, during an idle mode, samples of first signals received on a first carrier frequency having a first bandwidth; and determine that a second carrier frequency different from the first carrier frequency has a second bandwidth that overlaps with the first bandwidth of the first carrier frequency; and perform, during said idle mode, inter-frequency measurements on one or more second signals transmitted on the second carrier frequency using the samples of the first signals transmitted on the first carrier frequency.

In some embodiments, the processing circuits are further configured to perform the inter-frequency measurements on a portion of the second bandwidth that overlaps the first bandwidth.

In some embodiments, the processing circuits are further configured to perform the inter-frequency measurements on the entirety of the second bandwidth.

In some embodiments, the processing circuits are further configured to perform, during said idle mode, intra-frequency measurements on one or more of the first signals using said samples.

In some embodiments, the first carrier frequency is a serving carrier frequency.

In some embodiments, the processing circuits are further configured to send to a network node a measurement report including inter-frequency measurements made on the second carrier frequency.

In some embodiments, the measurement report indicates that the inter-frequency measurements span a portion only of the second bandwidth.

In some embodiments, the measurement report includes an indication of the portion of the second bandwidth on which the measurements where performed.

In some embodiments, the processing circuits are further configured to cancel interference due to the second signals from said samples to obtain reduced interference samples; and perform measurements on the first signals using the reduced interference samples.

In some embodiments, the processing circuits are further configured to cancel interference due to the second signals from said samples to obtain reduced interference samples by estimating the second signals; transforming the estimated second signal to corresponding signals on a frequency grid associated with the first carrier frequency; subtracting the transformed signal from the received samples of the first signal.

In some embodiments, the processing circuit further configured to cancel interference due to the first signals from said samples to obtain reduced interference samples; and perform measurements on the second signals using the reduced interference samples.

In some embodiments, the processing circuits are further configured to perform frequency correction on the samples to adjust the samples to a frequency grid associated with the second carrier frequency.

In some embodiments, the processing circuits are configured to perform the inter-frequency measurements during a discontinuous reception (DRX) activity period.

In some embodiments, the processing circuits are configured to signal, to another network node, a capability of performing inter-frequency measurements for the second signals within a portion of the second bandwidth that overlaps with the first bandwidth.

In some embodiments, the processing circuits are configured to adapt measurement parameters for said inter-frequency measurements.

In some embodiments, the processing circuits are configured to adapt measurement parameters for said inter-frequency measurements by adapting a bandwidth and/or filter length of a measurement filter.

In some embodiments, the processing circuits are configured to scale the estimated or measured parameter depending on the measurement bandwidth.

Still other embodiments of the disclosure comprise methods performed by a network node in a wireless communication network. One exemplary method comprises determining that the carrier frequencies of first and second carriers transmitted by one or more network nodes are different and that the bandwidths of the first and second carriers overlap; and configuring a wireless terminal to perform inter-frequency measurements in an idle mode on second signals transmitted on said second carrier using samples obtained by sampling first signals transmitted on said first carrier.

In some embodiments, the method further comprises obtaining a capability of the wireless terminal to perform inter-frequency measurements on the second signals transmitted on the second carrier frequency; and configuring the wireless terminal to perform the inter-frequency measurement based on the capability of the wireless terminal.

In some embodiments, the method further comprises configuring the wireless terminal to cancel interference in the first signals caused by the second signals; and perform measurements on the first signals.

In some embodiments, configuring the wireless device further comprises indicating to said wireless terminal a type of inter-frequency measurement to be performed on said second signals.

In some embodiments, configuring the wireless device further comprises configuring, based on a measurement bandwidth for said second signals, a timer for said inter-frequency measurements.

In some embodiments, configuring the wireless device comprises configuring at least one of a measurement filter constant and scaling factor.

In some embodiments, configuring the wireless device comprises configuring reporting of said measurement to said network node by said wireless terminal (50, 400).

In some embodiments, the method further comprises sending assistance data to said wireless terminal to facilitate said inter-frequency measurements.

In some embodiments, the assistance data comprises at least one of: a carrier frequency of said second carrier; timing information for radio signals transmitted on said second carrier; frequency accuracy of radio signals transmitted on said second carrier; a frequency shift between said first and second carriers at the transmitters; a frequency shift between said first and second carriers at a receiver; information describing the part of the second bandwidth on which measurements are to be performed; and a receiver configuration.

In some embodiments, the method further comprises receiving said inter-frequency measurements from said wireless terminal.

In some embodiments, the method further comprises using said inter-frequency measurement to perform at least one of: radio resource management; mobility management;

interference coordination, network configuration; antenna configuration; and network planning.

Yet another embodiment of the disclosure comprises a network node in a wireless communication network. In one exemplary embodiment, the network node comprises a communication interface for communicating over the wireless communication network; and processing circuits connected to the communication interface. The processing circuit are configured to determine that the carrier frequencies of first and second carriers are different and that the bandwidths of the first and second carriers overlap; and configure a wireless terminal in the wireless communication network to perform inter-frequency measurements in an idle mode on second signals transmitted on said second carrier using samples obtained by sampling first signals transmitted on said first carrier.

In some embodiments, the processing circuits are further configured to obtain (e.g., to determine or to receive from the wireless device or another network node) a capability of the wireless terminal to perform inter-frequency measurements on the second signals transmitted on the second carrier frequency; and configure the wireless terminal to perform the inter-frequency measurement based on the capability of the wireless terminal.

In some embodiments, the processing circuits are further configured to cancel interference in the first signals caused by the second signals; and perform measurements on the first signals.

In some embodiments, configuring a wireless terminal by said processing circuit comprises indicating to the wireless terminal a type of inter-frequency measurement to be performed on said second signals.

In some embodiments, configuring a wireless terminal by said processing circuit comprises configuring a timer for said inter-frequency measurements.

In some embodiments, configuring a wireless terminal by said processing circuit comprises configuring at least one of a measurement filter constant and scaling factor.

In some embodiments, configuring a wireless terminal by said processing circuit comprises configuring reporting of said measurement to said network node by said wireless terminal.

In some embodiments, the processing circuits are further configured to send assistance data to said wireless terminal to facilitate said inter-frequency measurements.

In some embodiments, the assistance data comprises at least one of: a carrier frequency of said second carrier; timing information for radio signals transmitted on said second carrier; frequency accuracy of radio signals transmitted on said second carrier; a frequency shift between said first and second carriers at the transmitters; a frequency shift between said first and second carriers at a receiver; information describing the part of the second bandwidth on which measurements are to be performed; and a receiver configuration.

In some embodiments, the processing circuits are further configured to receive said inter-frequency measurements from said wireless terminal (50, 400).

In some embodiments, the processing circuits are further configured to use said inter-frequency measurement to perform at least one of: radio resource management; mobility management; interference coordination, network configuration; antenna configuration; and network planning.

Embodiments of the disclosure enable a wireless terminal to perform inter-frequency measurements in idle mode when the bandwidth of a second signal transmitted on a second carrier frequency overlaps at least in part with the bandwidth of a first signal transmitted on a first carrier frequency. The inter-frequency measurements may be performed with the same samples obtained for the first signals. The inter-frequency measurements may be used to cancel interference, and to enable better coordination between network nodes operating on different frequencies

DETAILED DESCRIPTION

Figure 1:
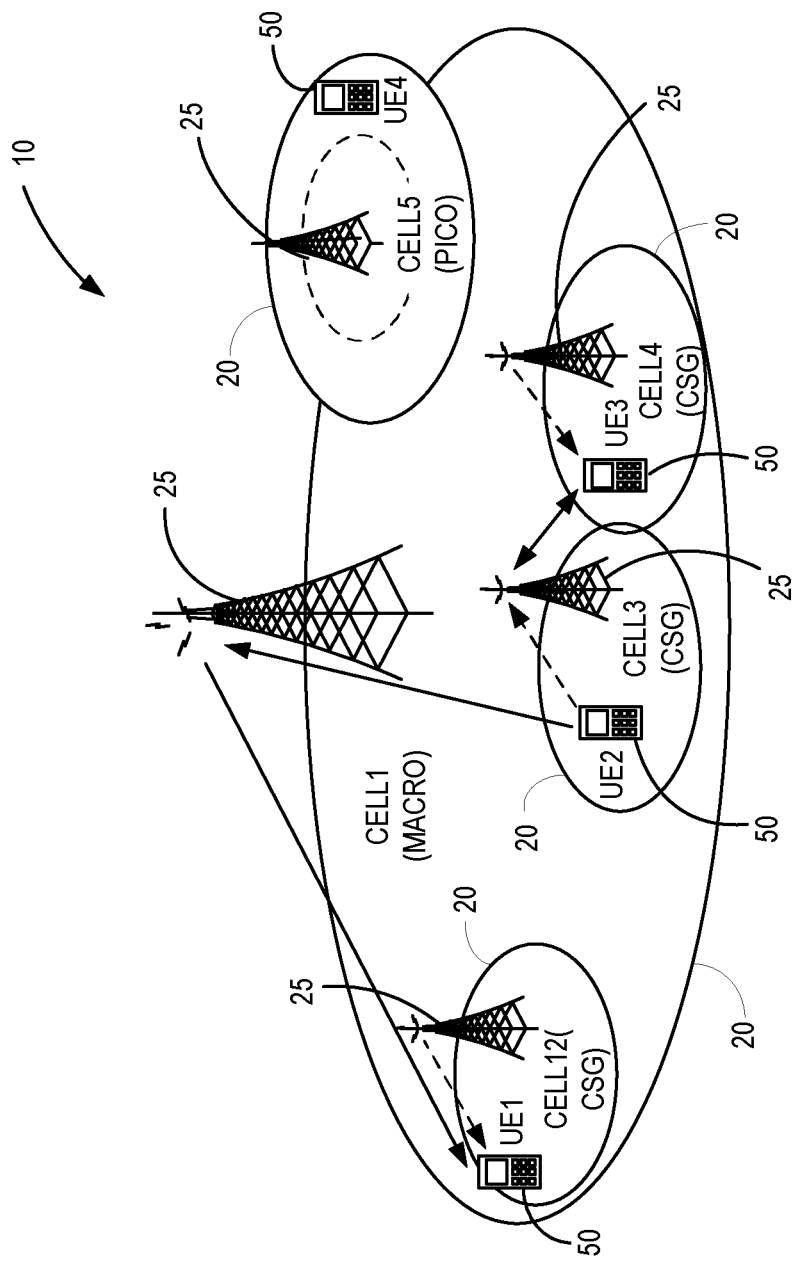
FIG. 1 illustrates a heterogeneous network deployment.

Turning now to the drawings, FIG. 1 illustrates an exemplary heterogeneous communication network 10 according to one exemplary embodiment of the present disclosure. The present disclosure is described in the context of a Long-Term Evolution (LTE) network, which is specified in Release 10 of the LTE standard. However, those skilled in the art will appreciate that the disclosure may be applied in heterogeneous networks using other communication standards. For convenience, similar elements throughout the Figures are indicated by similar reference numbers.

The communication network 10 comprises five cells 20 denoted as Cell1-Cell5 and five base stations 25. Cell1 comprises a macro cell served by a high power base station 25. Cell2-Cell 4 comprise closed subscriber group (CSG) cells 20 served by low-power base stations 25 (e.g., home base stations). Cell 5 comprises a pico cell, which is also served by a low power base station 25 (e.g. pico base station). Cell5 (the pico cell) partially overlaps with the coverage area of Cell1 (the macro cell). Four wireless terminals 50, referred to in the LTE standard as user equipment (UE), are shown in FIG. 1. The wireless terminal 50 denoted as UE1 is served by the high power base station 25 in Cell1 and the downlink transmissions are subject to interference from the low power base station 25 in Cell2. The wireless terminal 50 denoted as UE2 is served by the high power base station 25 in Cell1 and its uplink transmissions to the high power base station 25 in Cell1 cause interfere towards the nearby low power base station 25 in Cell3. The wireless terminal 50 denoted as UE3 is served by the low power base station 25 in Cell3 and is subject to interference from the nearby low power base station 25 in Cell4. The wireless terminal 50 denoted as UE4 is served by the low power base station 25 in Cell5 and is within the extended cell range (CRE) area. The various interfering scenarios illustrated in FIG. 1 demonstrate some of the challenges in achieving efficient network operation and superior user experience in a heterogeneous network deployment.

Figure 2:
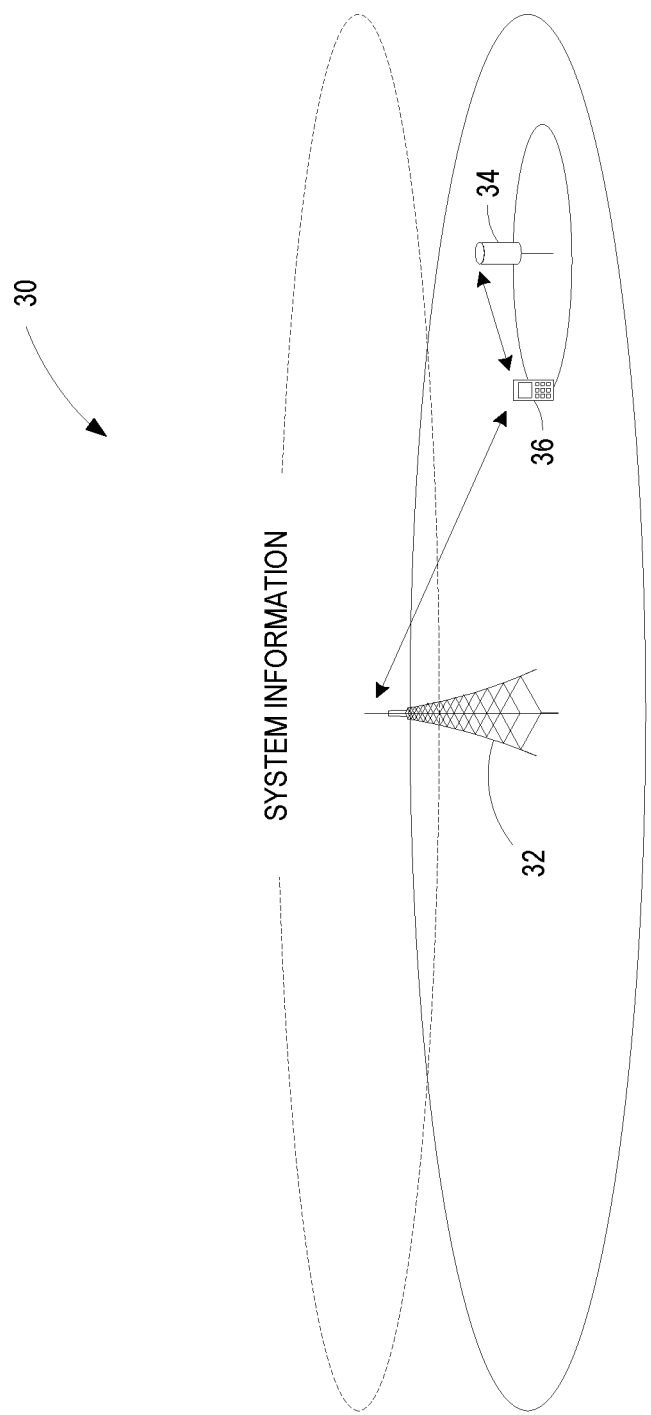
FIG. 2 illustrates a network deployment using dual connectivity.

To further improve communications, dual connectivity may be used in conjunction with heterogeneous networks. An example of a communication network 10 using dual connectivity is shown in FIG. 2. In the example shown in FIG. 2, a wireless terminal 50 has dual connectivity to a high power base station 25 in an anchor cell 30 (anchor node) and a low power base station 25 in a booster cell 35 (booster node). The anchor cell 30 may comprise a macro cell. The booster cell 35 may comprise a pico cell or femto cell.

System information or other important information is provided by the high power base station 25 in the anchor cell 30. The wireless terminal 50 is always connected to one anchor cell 30. The wireless terminal 50 can be connected to one or more booster cells 35. A base station 25 acting as an anchor node for one wireless terminal 50 may act as a booster node for another wireless terminal 50. Anchor and booster connections may be on same or different frequency. Scheduling of resources in the anchor cell 30 and booster cell 35 may be performed separately. The arrangement also allows for separation between the uplink/downlink (UL/DL) connections providing the following advantages:

Path-loss based UL RP selection
Reduced power consumption by the wireless terminal 50.
More balanced interference from the anchor cell towards the booster cell.
Alternative to almost blank subframes (ABSs) for cell range expansion (CRE) area.
Efficient macro cell offloading in uplink (UL).

One common problem related to heterogeneous networks is that it is often difficult for a wireless terminal 50 to perform measurements on signals transmitted from a low-power base station 25 in a heterogeneous network due to interference from neighboring high-power base stations 25. Yet accurate signal estimates and measurements are needed for important functionalities such as cell search, cell identification, mobility management, Radio Link Management (RLM) and Radio Resource Management (RRM), etc.

Physical-layer or radio measurements may be classified by type, purpose, carrier frequency (intra- or inter-frequency), radio access technology (RAT) (intra- or inter-RAT), etc. For example, the measurements may comprise:

Radio Resource Management (RRM) measurements (e.g., cell identification, signal strength, signal quality, wideband Reference Signal Received Quality (RSRQ), wideband Reference Signal Received Power (RSRP));
Radio Link Monitoring (RLM) measurements;
Mobility measurements (e.g., signal strength, signal quality);
Timing measurements (e.g., round trip time (RTT), user equipment (UE) Rx-Tx, Evolved NodeB (eNodeB) Rx-Tx, timing advance, time of arrival (ToA), time difference of arrival (TDOA), reference signal time difference (RSTD), one-way propagation delay, etc.);
Positioning measurements (e.g., measurements for Enhanced Cell ID (E-CID), Adaptive Enhanced Cell ID (AECID), fingerprinting, pattern matching, observed time difference of arrival (OTDOA), hybrid or other positioning method);
Minimization of Drive Tests (MDT) and the like measurements;
Channel state estimation measurements (e.g., channel state information (CSI), Channel quality indication (CQI), rank indication (RI), precoder matrix indication (PMI), etc.);
Direction measurements (e.g., angle of arrival (AoA));
Measurements may also be classified by link type or cell type. For example, the measurements may comprise carrier aggregation (CA) measurements, coordinated multipoint (CoMP) measurements, etc.

In heterogeneous networks, measurements must be performed both intra-frequency and inter-frequency. The inter-frequency measurements may involve different radio access technologies (RATs) and/or different operating bands. To define whether intra-frequency, inter-frequency, or inter-RAT requirements apply, the serving cell frequency and RAT are compared to other cells (e.g. target cells) for which measurements are performed. An inter-band measurement may be viewed as a special type of inter-frequency measurement where the inter-frequency belongs to another frequency band. Typically, a band is defined for a specific technology, so inter-RAT may also be inter-frequency, though not any inter-frequency is inter-RAT. However, some bands may be specified for use by different technologies or may even be used by two or more RATs at a time.

In the Third Generation Partnership Project (3GPP) specification TS 36.101 for LTE, a carrier frequency in the uplink and downlink is designated by the E-UTRA (Evolved Universal Terrestrial Radio Access) Absolute Radio Frequency Channel Number (EARFCN) in the range 0-65535. The relation between EARFCN and the carrier frequency in MHz for the downlink is given by:

$$F_{DL} = F_{DL\_low} + 0.1(N_{DL} - N_{Offs\text{-}DL})$$

where $F_{DL\_low}$ and $N_{Offs\text{-}DL}$ are given in Table 1 below, and $N_{DL}$ is the downlink EARFCN:
The relation between EARFCN and the carrier frequency in MHz for the uplink is given by the following equation:

$$F_{UL} = F_{UL\_low} + 0.1(N_{UL} - N_{Offs\text{-}UL})$$

where $F_{UL\_low}$ and $N_{Offs\text{-}UL}$ are given in Table 1, and $N_{UL}$ is the uplink EARFCN.

TABLE 1

E-UTRA channel numbers [TS 36.101]

| E-UTRA Operating Band | Downlink | | | Uplink | | |
|---|---|---|---|---|---|---|
| | $F_{DL\_low}$ (MHz) | $N_{Offs\text{-}DL}$ | Range of $N_{DL}$ | $F_{UL\_low}$ (MHz) | $N_{Offs\text{-}UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |

TABLE 1-continued

E-UTRA channel numbers [TS 36.101]

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4949 | 1427.9 | 22750 | 22750-22949 |
| 12 | 729 | 5010 | 5010-5179 | 699 | 23010 | 23010-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| 18 | 860 | 5850 | 5850-5999 | 815 | 23850 | 23850-23999 |
| 19 | 875 | 6000 | 6000-6149 | 830 | 24000 | 24000-24149 |
| 20 | 791 | 6150 | 6150-6449 | 832 | 24150 | 24150-24449 |
| 21 | 1495.9 | 6450 | 6450-6599 | 1447.9 | 24450 | 24450-24599 |
| 22 | 3510 | 6600 | 6600-7399 | 3410 | 24600 | 24600-25399 |
| 23 | 2180 | 7500 | 7500-7699 | 2000 | 25500 | 25500-25699 |
| 24 | 1525 | 7700 | 7700-8039 | 1626.5 | 25700 | 25700-26039 |
| 25 | 1930 | 8040 | 8040-8689 | 1850 | 26040 | 26040-26689 |
| 26 | 859 | 8690 | 8690-9039 | 814 | 26690 | 26690-27039 |
| 27 | 852 | 9040 | 9040-9209 | 807 | 27040 | 27040-27209 |
| 28[2] | 758 | 9210 | 9210-9659 | 703 | 27210 | 27210-27659 |
| 29[2] | 717 | 9660 | 9660-9769 | | N/A | |
| ... | | | | | | |
| 33 | 1900 | 36000 | 36000-36199 | 1900 | 36000 | 36000-36199 |
| 34 | 2010 | 36200 | 36200-36349 | 2010 | 36200 | 36200-36349 |
| 35 | 1850 | 36350 | 36350-36949 | 1850 | 36350 | 36350-36949 |
| 36 | 1930 | 36950 | 36950-37549 | 1930 | 36950 | 36950-37549 |
| 37 | 1910 | 37550 | 37550-37749 | 1910 | 37550 | 37550-37749 |
| 38 | 2570 | 37750 | 37750-38249 | 2570 | 37750 | 37750-38249 |
| 39 | 1880 | 38250 | 38250-38649 | 1880 | 38250 | 38250-38649 |
| 40 | 2300 | 38650 | 38650-39649 | 2300 | 38650 | 38650-39649 |
| 41 | 2496 | 39650 | 39650-41589 | 2496 | 39650 | 39650-41589 |
| 42 | 3400 | 41590 | 41590-43589 | 3400 | 41590 | 41590-43589 |
| 43 | 3600 | 43590 | 43590-45589 | 3600 | 43590 | 43590-45589 |
| 44 | 703 | 45590 | 45590-46589 | 703 | 45590 | 45590-46589 |

NOTE 1:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.
NOTE
[2]Restricted to E-UTRA operation when carrier aggregation is configured.

In heterogeneous networks, carriers in different cells may also use carriers of different bandwidth. Different bandwidth definitions exist in LTE (see e.g., TS 36.101) and other systems. The term bandwidth may denote any of the following:
System bandwidth.
Channel bandwidth—The radio frequency (RF) bandwidth supporting a single E-UTRA radio frequency (RF) carrier with the transmission bandwidth configured in the uplink or downlink of a cell. The channel bandwidth is measured in MHz and is used as a reference for transmitter and receiver RF requirements.
Transmission bandwidth—The bandwidth of an instantaneous transmission from a wireless terminal 50 or base station (BS), measured in Resource Blocks (RBs).
Transmission bandwidth configuration—The highest transmission bandwidth allowed for uplink or downlink in a given channel bandwidth, measured in RBs.
Aggregated channel bandwidth—The RF bandwidth in which a base station 25 or wireless terminal 50 transmits and receives multiple contiguously aggregated carriers. The aggregated channel bandwidth is measured in MHz.
Sub-block bandwidth—The bandwidth of one sub-block, where the sub-block is one contiguous allocated block of spectrum for transmission and reception by the same base station 25 or wireless terminal 50. There may be multiple instances of sub-blocks within an RF bandwidth.
Measurement bandwidth—The bandwidth over which a measurement is performed. The measurement bandwidth of a signal cannot exceed its transmission bandwidth.

In heterogeneous networks, different cells may also use different RATs. Some examples of different RATs are Long Term Evolution (LTE) and Wideband Code Division Multiple Access (WCDMA), or LTE Frequency Division Duplex (FDD) and LTE Time Division Duplex (TDD), or Global System for Mobile Communications (GSM) with General Packet Radio Service (GPRS) and Enhanced Data Rates for Global Evolution (EDGE).

To understand some of the difficulties in making intra-frequency and inter-frequency measurements in heterogeneous networks, the following discussion focuses on measurements for mobility management. Similar principles apply to other types of measurements.

Intra-frequency and inter-frequency measurements for mobility are described e.g. in the 3GGP specification TS 36.300. Measurements to be performed by a wireless terminal 50 for intra/inter-frequency mobility may be controlled by the Evolved Universal Terrestrial Radio Access Network (E-UTRAN), using broadcast or dedicated control channels. In RRC_IDLE state, a wireless terminal 50 follows the measurement parameters defined for cell reselection specified by the E-UTRAN broadcast. The use of dedicated measurement control for RRC_IDLE state is also possible, e.g., through the provision of device-specific priorities. In RRC_CONNECTED state, a wireless terminal 50 follows the measurement configurations specified by RRC directed from the E-UTRAN (e.g., as in UTRAN MEASUREMENT_CONTROL).

Intra-frequency neighbor cell measurements comprise neighbor cell measurements performed by the wireless terminal 50 when the current and target cell operates on the same carrier frequency. The wireless terminal 50 shall be able to carry out such measurements without measurement gaps. Inter-frequency neighbor cell measurements comprise neighbor cell measurements performed by the wireless terminal 50 when the neighbor cell operates on a different carrier frequency, compared to the current cell. The wireless terminal 50 should not be assumed to be able to carry out such measurements without measurement gaps.

Whether a measurement is non gap assisted or gap assisted depends on the capability of the wireless terminal 50 and the current operating frequency. The wireless terminal 50 determines whether a particular cell measurement needs to be performed in a transmission/reception gap and the scheduler needs to know whether gaps are needed. Examples of intra-frequency scenarios are Scenarios A, B, and C in FIG. 3:

Scenario A: Same carrier frequency and cell bandwidth for current serving cell and target cell;
Scenario B: Same carrier frequency, and bandwidth of the target cell is smaller than the bandwidth of the current serving cell;
Scenario C: Same carrier frequency, and bandwidth of the target cell is larger than the bandwidth of the current cell.

Figure 3:
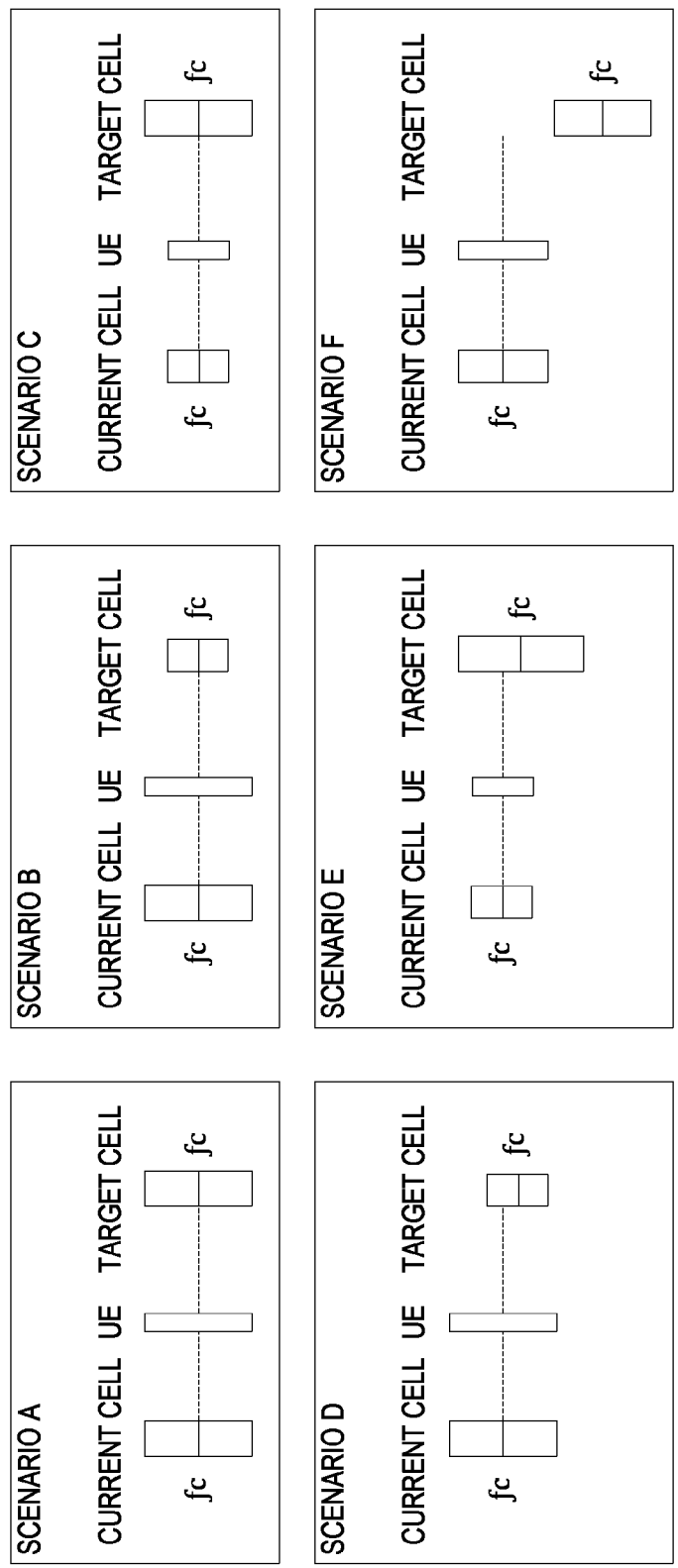
FIG. 3 illustrates inter-frequency and intra-frequency measurement scenarios.

Examples of inter-frequency scenarios are Scenarios D, E, and F in FIG. 3:

Scenario D: Different carrier frequencies, and bandwidth of the target cell is smaller than and within the bandwidth of the current serving cell.
Scenario E: Different carrier frequencies, and bandwidth of the target cell is larger than and includes the bandwidth of the current serving cell.
Scenario F: Different carrier frequencies and non-overlapping bandwidth.

The disclosure focuses on Scenario D, Scenario E, or any inter-frequency scenario where the target bandwidth overlaps with the serving bandwidth, at least in part. The inter-frequency Scenario F is beyond the scope of the disclosure since there is no overlap between the interfering bandwidth and measured bandwidth.

Measurement gap patterns are configured and activated by Radio Resource Control (RRC). In Long Term Evolution (LTE), measurement gaps are as specified in TS 36.133. The Evolved Universal Terrestrial Radio Access (E-UTRA) UE supports two configurations comprising of the maximum gap repetition period (MGRP) of 40 and 80 ms; both with the measurement gap length of 6 ms. In practice due to the frequency switching time less than 6 sub-frames but at least 5 full sub-frames are available for measurements within each such measurement gap. Unlike in Universal Terrestrial Radio Access (UTRA), one measurement gap pattern is used in LTE for all measured inter-frequencies and RATs. In UTRAN Frequency Division Duplex (FDD), the measurements on other UTRA FDD carriers and on other RATs (e.g. LTE, GSM, etc.) are carried out in compressed mode (CM) gaps, which occur periodically. For example a CM gap pattern may comprise of 10 UTRA FDD slots (1 slot=0.67 ms) gap occurring every 2nd frame (1 frame=10 ms). One main difference between UTRAN FDD and LTE is that in the former, one CM pattern is used for each carrier, e.g., 2 CM patterns for measuring on two different UTRA FDD carriers.

When Carrier Aggregation (CA) is configured, the "current cell" above refers to any serving cell of the configured set of serving cells, i.e., Primary Cell (PCell) or Secondary Cell (SCell). For instance, for the definition of intra- and inter-frequency measurements, this means:

Intra-frequency neighbor cell measurements: Neighbor cell measurements performed by the wireless terminal 50 are intra-frequency measurements when one of the serving cells of the configured set (comprising activated and/or not activated serving cells) and the target cell operates on the same carrier frequency. The wireless terminal 50 shall be able to carry out such measurements without measurement gaps.

Inter-frequency neighbor cell measurements: Neighbor cell measurements performed by the wireless terminal 50 are inter-frequency measurements when the neighbor cell operates on a different carrier frequency than any serving cell of the configured set. The wireless terminal 50 should not be assumed to be able to carry out such measurements without measurement gaps.

In a system with a sufficient number of cells on an intra-frequency, mobility within the same frequency layer (i.e., between cells with the same carrier frequency) is predominant. Good neighbor cell measurements are needed for cells that have the same carrier frequency as the serving cell in order to ensure good mobility support and easy network deployment. However, the number of good cells on a frequency may be not sufficient, or the quality of cells may be better than on another frequency. There may also be preferred cells of a certain type, e.g., for fast moving wireless terminals 50 36 large cells may be more preferred.

In general, in LTE, inter-RAT measurements are typically defined similar to inter-frequency measurements, e.g., they may also require configuring measurement gaps. Inter-RAT measurements may have more measurements restrictions and more relaxed measurement requirements.

The current specification defines requirements for cell (re)selection and measurements in RRC_IDLE in TS 36.133 and TS 36.304. More specifically the wireless terminal 50 is required to perform inter-frequency and/or inter-RAT measurements for cell re-selection purposes on at least 8 frequency layers. These measurements may be further logged for MDT purposes. The wireless terminal 50 shall be able to identify new inter-frequency cells and perform RSRP or RSRQ measurements of identified inter-frequency cells if carrier frequency information is provided by the serving cell, even if no explicit neighbor list with physical layer cell identities is provided. If Srxlev>SnonIntraSearchP and Squal>SnonIntraSearchQ, the wireless terminal 50 shall search every inter-frequency layer of higher priority at least every Thigher_priority_search where Thigher_priority_search=(60*Nlayers) seconds, and Nlayers is the total number of configured higher priority E-UTRA, UTRA FDD, UTRA TDD, CDMA2000 1× and HRPD carrier frequencies and is additionally increased by one if one or more groups of GSM frequencies is configured as a higher priority.

If Srxlev ? SnonIntraSearchP or Squal ? SnonIntraSearchQ, the wireless terminal 50 shall search for and measure inter-frequency layers of higher, equal or lower priority in preparation for possible reselection.

When higher priority cells are found by the higher priority search, they shall be measured at least every Tmeasure, E-UTRAN_Inter. The wireless terminal 50 shall measure RSRP or RSRQ at least every Kcarrier*Tmeasure, EUTRAN_Inter for identified lower or equal priority inter-frequency cells.

For an inter-frequency cell that has been already detected, but that has not been reselected, the filtering shall be such that the wireless terminal 50 shall be capable of evaluating that the inter-frequency cell has met reselection criterion defined TS 36.304 within Kcarrier*Tevaluate, E-UTRAN_Inter when Treselection=0 provided that the reselection criteria is met by a margin of at least 5 dB for reselections based on ranking or 6 dB for RSRP reselections based on absolute priorities or 4 dB for RSRQ reselections based on absolute priorities. When evaluating cells for reselection, the side conditions for RSRP and SCH apply to both serving and inter-frequency cells.

The above means that the wireless terminal 50 is not required to perform (and thus most likely will not do) inter-frequency measurements in idle when the current camping cell is strong, even if the inter-frequency cell is available to the wireless terminal 50 and it is in a higher priority list.

Currently, there are no accuracy or total measurement time (only measurement periodicity is covered so far) requirements for inter-frequency/inter-RAT measurements in idle.

The cell detection time is scaled with the number of frequency carriers, resulting in a longer time for cell reselection.

In some inter-frequency scenarios such as Scenarios D and E in FIG. 1, being in idle mode, the wireless terminal 50 may receive interference from another frequency. To handle the interference, the wireless terminal 50 needs to receive and estimate the interfering inter-frequency signal. There are two conditions, signal strength and quality. If the quality is bad (i.e. the interference is high), the wireless terminal 50 may perform inter-frequency measurements, but not for inter-frequency interference handling but rather for cell re-selection.

Currently, to improve performance (e.g., measurement time or cell-reselection time) the wireless terminal 50 does not exploit the advantages provided by some inter-frequency scenarios where the bandwidths overlap. The current inter-frequency requirements defined for the idle mode in TS 36.133 are worse than intra-frequency requirements.

In advanced heterogeneous or small cell deployments, different nodes may operate on different frequencies, but at the same time a tighter cooperation (e.g., faster detection, quicker inter-frequency measurements, a different way of handling of inter-frequency measurements for the paired nodes, etc.) between such nodes may be desired. The invention is not limited to such deployments, but may also be used to increase their performance.

In the prior art, inter-frequency measurements are not performed on a part of the bandwidth overlapping with a serving-cell bandwidth, in any activity state.

Exemplary embodiments of the disclosure provide inter-frequency measurement techniques for use in scenarios where radio transmissions on a first carrier frequency having a first carrier frequency F1 and first bandwidth BW1 are interfered by radio transmission on a second carrier having a second carrier frequency F2 and second bandwidth BW2. The scenarios of interest are those where the bandwidths of the first and second carriers overlap at least in part. Some examples of such scenarios are Scenario D and Scenario E in FIG. 3. The term "inter-frequency" herein may also comprise any one or a combination of inter-frequency, inter-band, and/or inter-RAT. A transmission herein may refer to a downlink transmission. Some examples of downlink transmissions include the transmission of a physical signal (e.g., reference signal or synchronization signal), physical channel (e.g., Physical Broadcast Channel (PBCH), Physical Downlink control Channel (PDCCH), Enhanced Physical Downlink control Channel (EPDCCH), or Physical Downlink Shared Channel (PDSCH)), or logical channel transmissions. The term "bandwidth" herein may refer to any bandwidth describing an interfering (aka aggressor) signal/channel and/or interfered (aka "victim") signal/channel.

Some embodiments of the disclosure comprise methods implemented in a wireless device of performing inter-frequency measurements on a non-serving carrier frequency F2 in idle mode, when bandwidths BW1 and BW2 of different carrier frequencies F1 and F2 overlap. The wireless device may perform the measurements by digitally processing the signal samples obtained or used for intra-frequency measurements on a serving carrier frequency F1. The measurements may be performed over full entire bandwidth BW2 (e.g., when within bandwidth BW1 or almost within bandwidth BW1) or over a portion of bandwidth BW2 which is overlapping with bandwidth BW1

Other embodiments of the disclosure comprise methods implemented in a wireless device of performing measurements on a measured carrier frequency F1 in idle mode in presence of interfering signals transmitted on carrier frequency F2, where the bandwidths BW1 and BW2 of different carrier frequencies F1 and F2 overlap, and one of carrier frequencies F1 and F2 is a non-serving carrier frequency and another one is a serving carrier frequency Still other embodiments of the disclosure comprise methods implemented in a network node of configuring inter-frequency measurements in idle mode, when the bandwidths BW1 and BW2 of different carrier frequencies F1 and F2 overlap. These methods account for the wireless device capability related to performing inter-frequency measurements on carrier frequencies F1 and F2, when bandwidths BW1 and BW2 overlap.

Figure 4:
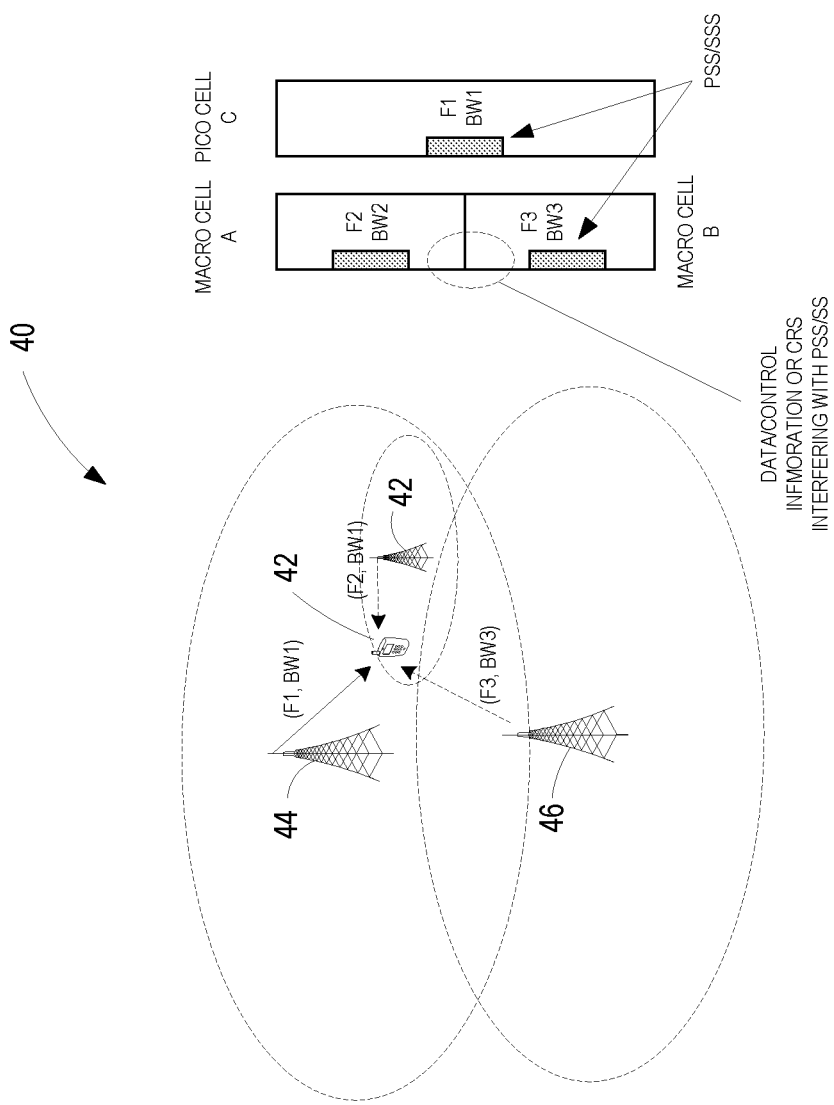
FIG. 4 illustrates an exemplary interference scenario.

FIG. 4 shows a relevant, non-limiting example scenario for some embodiments of the disclosure. FIG. 4 illustrates a heterogeneous network deployment 10 comprising a pico cell (Cell A) served by a low power base station 25, and two macro cells (Cells B and C) served by high power base stations 25. The low power base station 25 in cell A transmits on a first carrier frequency F1 with 10 MHz bandwidth (BW1). The other two base stations 25 transmit on carrier frequencies F2 and F3 respectively, each with 5 MHz bandwidths (BW2 and BW3). This configuration may be used for example, to exploit the benefits (low interference) provided by frequency reuse greater than 1 between cells B and C. In this example scenario, the bandwidths BW2 and BW3 of Cells B and C overlap at least in part with the bandwidth BW1 of Cell A. The carrier frequencies F1, F2, and F3 for all three cells are different.

Since carrier frequencies F2 and F1 are different and have overlapping bandwidths, a wireless terminal 50 (e.g., wireless phone, smart phone, laptop, modem, smartphone, tablet, sensor, machine type communication (MTC) devices etc.) camping on or served by cell B (F2) may have a problem detecting the Primary Synchronization Signal (PSS) and Secondary Synchronization Signal (SSS) on carrier frequency F1 transmitted by the Cell A due to inter-frequency interference at least from carrier frequency F2 (e.g., when the wireless terminal 50 is in the CRE zone and the DL signal from Cell B is stronger than DL signal from Cell A. Since the PSS/SSS of the pico cell (Cell A) does not collide with PSS/SSS of the macro cell (Cell B), but instead with data or control or other signals like (CRS, BCH etc.) signals, the standard prior art PSS/SSS interference cancelling (IC) of the macro cell PSS/SSS does not work. Hence new approaches are needed.

In one exemplary embodiment, inter-frequency measurements techniques are used by the wireless terminal in idle mode to perform an estimation or measurement on interfering signals transmitted on an inter-frequency carrier having a bandwidth that overlaps with the bandwidth of the serving carrier frequency. The basic idea is that when bandwidths BW1 and BW2 overlap, the baseband signal sampled for an estimation or a measurement on a serving carrier frequency F1 may be used also for an estimation or a measurement on inter-frequency (non-serving) carrier frequency F2. The inter-frequency measurement may be on full bandwidth BW2 (e.g., when BW2 is within or almost within BW1) or on the portion of bandwidth BW2 comprised in the overlap (or vice versa, i.e., receiving for carrier frequency F2 and using for carrier frequency F1, though the former may occur more often at least on some scenarios).

Figure 5:
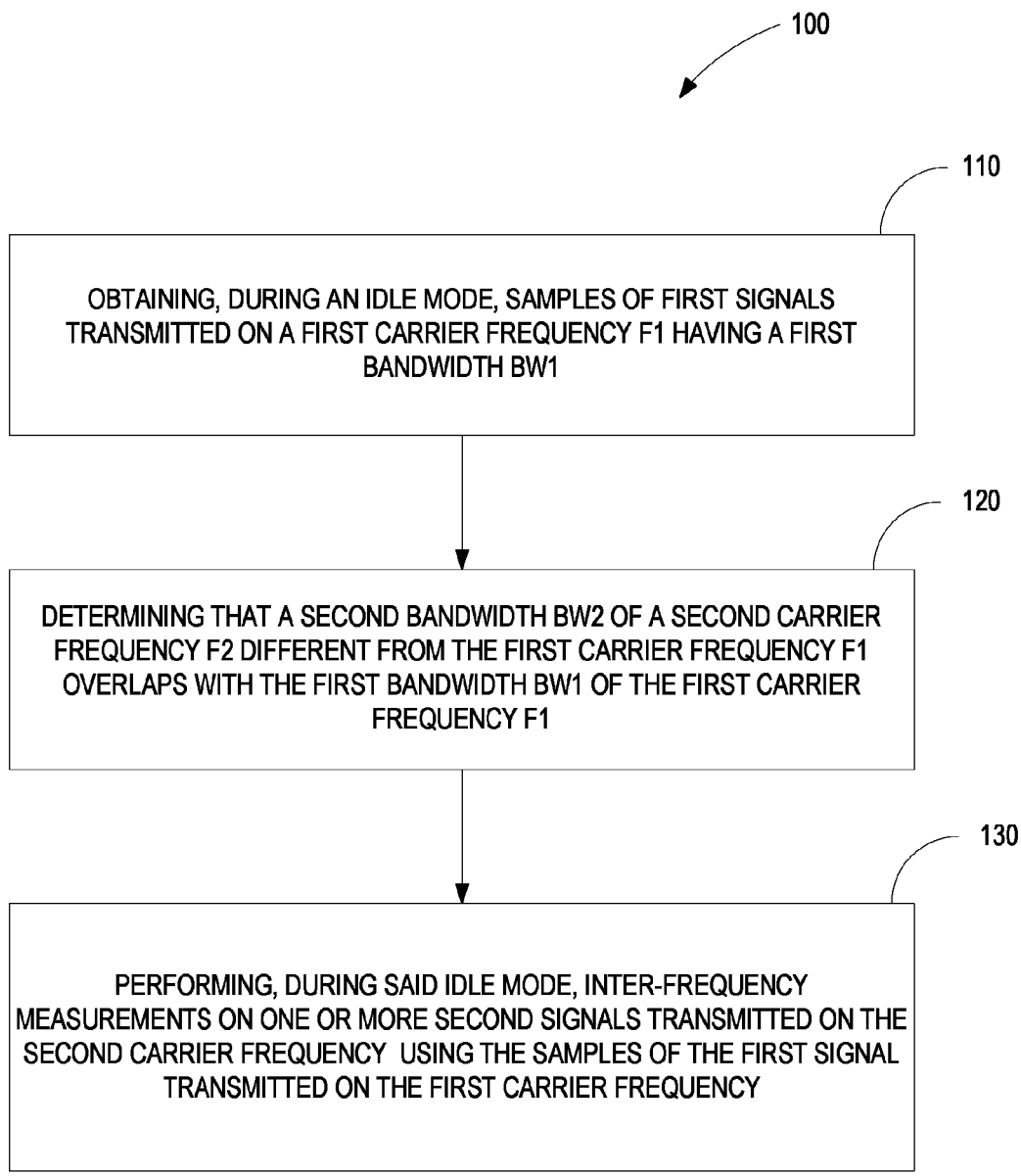
FIG. 5 illustrates a method of inter-frequency measurement implemented by a wireless terminal.

FIG. 5 illustrates a method 100 implemented by a wireless terminal 50 according to one embodiment. In this example, first signals are transmitted on a first carrier frequency F1. Second signals are transmitted on a second carrier frequency F2 different from the first carrier frequency F1. The bandwidths BW1 and BW2 respectively of the first and second carrier frequencies F1 and F2 overlap. The wireless terminal 50 obtains, during an idle mode (e.g. RRC IDLE mode), samples of the first signals transmitted on the first carrier frequency F1 (block 105). Typically, these samples are used for performing intra-frequency measurements on carrier frequency F1. The wireless device determines that the bandwidth BW2 of carrier frequency F2 overlaps the bandwidth BW1 of carrier frequency F1 (block 110). When the bandwidth of carrier frequency F2 overlaps with the bandwidth BW1 of carrier frequency F1, the wireless terminal 50 uses the samples of the first signals to perform inter-frequency measurements on the second signals transmitted on the second carrier frequency in the portion of the bandwidth BW2 that overlaps with the bandwidth BW1 of carrier frequency F1 (block 115).

In some embodiments, the second bandwidth BW2 may partially overlap the first bandwidth BW1. In this case, the inter-frequency measurements may span the portion of the second bandwidth BW2 that overlaps the first bandwidth BW1, i.e., BW1 ∩BW2. In other embodiments, the second bandwidth BW2 may lie entirely within the first bandwidth BW1. In this case, the inter-frequency measurements may span the entirety of the second bandwidth BW2.

The inter-frequency measurements may be reported to a network node (e.g., base station or control node). The report may indicate that the reported measurement is a measurement on a part of the bandwidth. In some embodiments, the report may indicate the portion of the second bandwidth BW2 on which the measurements were performed.

In some embodiments, the method may further comprise cancelling interference due to the second signals from said samples to obtain reduced interference samples, and performing measurements on the first signals using the reduced interference samples.

In some embodiments, the method may further comprise cancelling interference due to the first signals from said samples to obtain reduced interference samples, and performing measurements on the second signals using the reduced interference samples.

In some embodiments, the method may comprise performing the inter-frequency measurements during a discontinuous reception (DRX) activity period.

The methods herein described differ from prior art methods in that the bandwidth signal measurements (e.g., RSRP/RSRQ for instance) differ from currently defined measurement bandwidths. Furthermore, this embodiment may include configuration changes, such as adapting the measurement filters to the current measurement bandwidth. For example, in current LTE standards, the L1 measurement filter (aka measurement time e.g. in TS 36.133) is 200 ms assuming 6 resource blocks (RBs) of measurement bandwidth. If measurements are performed on only 4 RBs, the filtering time may be increased by 50%, i.e. up to 300 ms. Some embodiments may apply scaling factors to compensate for different parts on the bandwidth being used for signal measurements (compared to prior art methods). For example, in current LTE releases, only the central 6 RBs are used for measurements. In some embodiments, the wireless device may use another set of RBs due to scheduling rules. These RBs may have another load compared to the central RBs, and hence a scaling may be needed to obtain comparative results. This is especially the case for measurements reflecting load, like RSRQ.

For wireless terminal complexity, power consumption and resource consumption reasons, inter-frequency measurements in idle mode are currently performed when the camping cell signal is weak or has a poor quality. The measurement techniques according to the present disclosure avoid the need of separately receiving the inter-frequency signal to perform such measurements. Thus, in one embodiment, the wireless device may obtain an estimate or a measurement on inter-frequency carrier frequency F2 even when the signal from the camping cell on the serving carrier frequency F1 is good (e.g., received power is above a threshold and/or quality is above a threshold). The measurement may be performed for cell re-selection (but more efficiently compared to the current standard-compliant wireless terminals 50), but also for other purposes such as positioning, RRM tasks, MDT, SON, mitigating (e.g., suppressing, cancelling, rejecting, etc.) interference caused by signals transmitted on carrier frequency F2 with signals transmitted on carrier frequency F1, etc.

Further, in another embodiment, if the subcarriers for transmissions on carrier frequency F1 and subcarriers for transmissions on carrier frequency F2 are not aligned on the same sub-carrier grid, the wireless terminal 50 may perform additional processing. This may be possible since the EARFCN numbers defining the carrier spacing is with a 100 kHz grid, while the LTE sub-carrier spacing is 15 kHz. If this is the case, the receiver in the wireless terminal 50 may store the baseband signal in memory and use a digital mixer to correct or shift the frequency of the baseband signal to a carrier frequency matching the 15 kHz grid.

An example procedure for performing inter-frequency measurements by a wireless terminal 50 in the idle state may comprise the following steps (the order may be different in different implementations):

1. store received digital baseband signal in a buffer;
2. turn off receiver or at least do not use it to receive signals separately for inter-frequency;
3. (optional) take Fast Fourier Transform (FFT) or Discrete Fourier Transform (DFT) of the received baseband signal;
4. (optional) perform an estimation or a measurement (e.g., RSRP or RSEQ) on serving carrier frequency F1;
5. replay the digital baseband signal from the buffer;
6. (optional) if not on the same subcarrier grid, perform frequency correction by digitally mixing the digital baseband signal to shift the frequency of the digital baseband signal to the sub-carrier grid for carrier frequency F2;
7. take FFT or DFT for the frequency corrected baseband signal;
8. perform an estimation or a measurement (e.g. RSRP or RSRQ) on a non-serving carrier frequency F2;
9. (optional) perform an estimation or a measurement on serving carrier frequency F1 for removing/suppressing/rejecting the interference from non-serving carrier frequency F2 based on the obtained estimate or measurement on a non-serving carrier frequency F2;

With the reused baseband signal, there is no need for new samples specifically for the non-serving carrier frequency F2, there is no need to retune the receiver for the non-serving carrier frequency F2, and there is no need to retune the receiver to a larger bandwidth either when the overlap BW1 ∩BW2 is of interest. As a result, the wireless terminal 50 may be able to perform estimates or measurements on the non-serving carrier frequency F2 without measurement gaps (i.e., no need to involve the network node, which currently configures measurement gaps; no interruptions or effective measurement time limitation typical for measurement gaps; possibility to receive the interfering signal and the measured signal at the same time, etc.), and/or in a shorter time (e.g., the measurement time requirement may be shorter than that for the non-overlapping inter-frequency), and/or with a higher accuracy (e.g., due to the possibility to better handle the interference from a signal transmitted on another frequency; an example of handling the interference is interference cancellation, suppression, or rejection).

In IDLE mode, where DRX cycles are used and low power consumption is important, the wireless terminal 50 may not only perform intra frequency measurements, but also inter-frequency measurements during the same "receiver on" period on neighboring cells on a carrier frequency and system bandwidths that overlap, at least in part with the system bandwidth of the camping cell. Prior art methods requires longer a "receiver on" period per DRX cycle, a first period corresponding to the camping cell and a second period corresponding to the inter-frequency cell, to allow time for measurements on both cells.

The wireless terminal 50 may also be required to meet one or more requirements (e.g., measurement time requirement, measurement accuracy requirement, or requirement for an estimate obtained based on inter-frequency measurements such as a position accuracy obtained based on inter-frequency measurements, etc.), wherein the requirements may be different from inter-frequency requirements for scenarios when the wireless terminal 50 does not reuse the intra-frequency baseband signal for inter-frequency measurements. In one specific example, the measurement requirements may be the same or similar to intra-frequency when bandwidth BW2 on the non-serving carrier frequency F2 is within bandwidth BW1 on the serving carrier frequency F1.

In yet another embodiment, a specific type of inter-frequency measurement may be performed and/or the measurements may be used for a specific purpose. Some examples of measurements are as described in the 3GPP standard TS 36.214. Some example purposes are RRM, SON, MDT, positioning, interference handling, etc.

In yet another embodiment, the inter-frequency measurements may be performed for a specific type of deployment, e.g., advanced heterogeneous and small cell deployments.

In yet another embodiment, when not all wireless terminals 50 are capable of performing estimates or measurements as described above, a wireless terminal 50 may signal to a network node its capability of performing inter-frequency measurements in idle mode when bandwidths BW1 and BW2 overlap. In one example, the capability may also implicit in another capability or release indication (e.g., all devices in LTE Rel-12 have such capability). Some examples of the network node are: a base station such as an eNodeB, a control node, a positioning node, an MDT node, a SON node.

The estimates or measurements on the non-serving carrier frequency F2 may be performed according to embodiments described above, while being triggered, e.g., in one or more of the following ways:

Using best effort, without explicit request, e.g., upon resource availability or when the battery is above a threshold or when the device is in an energy-saving mode;

Upon a request or according to a configuration from another node,

Upon an event (e.g., state change);

When one or more conditions are met (e.g., when the interfered signal quality or signal-to interference plus noise (SINR) is below a threshold or the interfering signal strength is above a threshold, e.g., when the estimate is for the purpose of interference mitigation).

In some embodiments, the estimates or measurements on carrier frequency F2 are performed for the purpose of inter-frequency interference handling caused by transmissions on carrier frequency F2 with the signals transmitted on carrier frequency F1.

Figure 6:
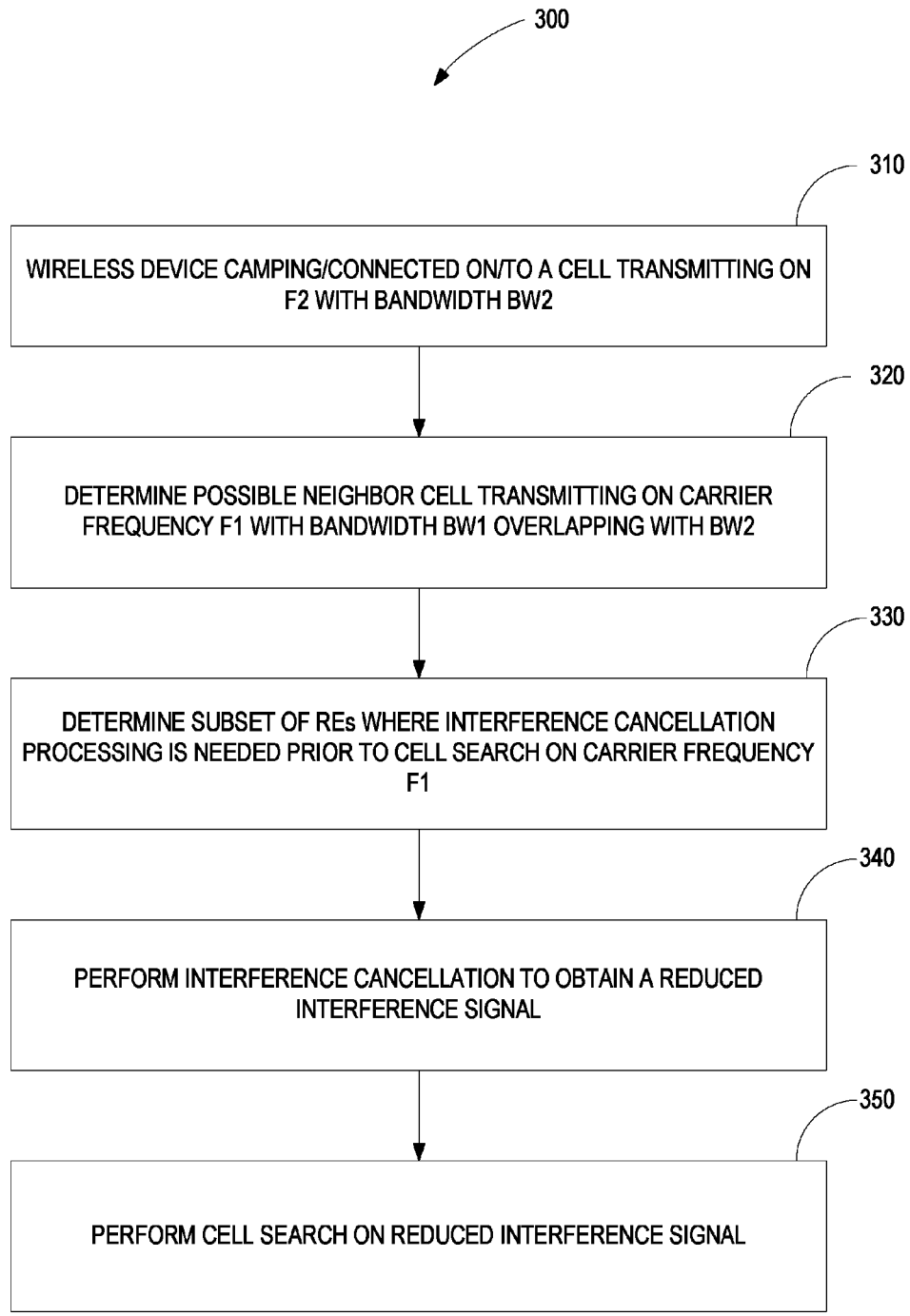
FIG. 6 illustrates a method implemented by a wireless terminal of performing a cell search.

FIG. 6 shows a method 150 performed by a wireless terminal 50 for handling interference caused by transmissions on carrier frequency F2 with signals on carrier frequency F1. A wireless terminal 50 is connected to (served by) a network node, (e.g., base station) in a first cell transmitting in the downlink (DL) direction on carrier frequency F2 with a system bandwidth BW2. The wireless terminal 50 may in idle mode be camping on the cell (block 155). The wireless terminal 50 determines that there might be a potential neighboring cell on a carrier frequency F1 with system bandwidth BW1, which at least partly overlaps with the system bandwidth BW2 of the serving cell (block 160). Different approaches for determine the potential second cell on carrier frequency F1 may be envisioned, e.g.

the wireless terminal 50 may receive the information from the camping/connected cell;

it may receive the information from another earlier connected cell or at connection set up.

The wireless terminal 50 then determines a subset of Resource Elements (REs) where interference cancellation (IC) is needed prior to cell search on carrier frequency F1 (block 165). In LTE, a RE comprises a subcarrier in one OFDM symbol. Examples of such REs that might need IC processing include REs containing known physical signals or known broadcast signals. The known physical signal may comprise pilot signals or reference signals such as cell-specific reference signals (CRS), demodulation reference signals (DM-RS), multicast broadcast single frequency network reference signals (MBSFN RS), positioning reference signals (PRS), etc. Known broadcast signals may include a master information block (MIB) or system information block 1 (SIB1). This subset of REs may be determined in a number of ways. In a first embodiment, the subset of REs may be signaled by a network node, e.g. base station. In another embodiment, the wireless terminal 50 itself determines the REs. This determination can be made for instance by knowing the camping cell physical cell Identity (PCI), which in turn indicates the REs that are being used to transmit CRSs. Also, the MIB/SIB position is known to a wireless terminal 50 for the camping cell. Because such information changes seldom or slowly, it can be seen as known by the wireless terminal 50. Therefore, it is possible to perform IC processing to remove such information.

The wireless terminal 50 performs interference cancellation (IC) processing, which may require possible preprocessing steps prior to the IC processing (block 170). The pre-processing steps may include digital frequency correction in case the sub-carrier grid for the subcarriers for the cells on carrier frequency F1 does not match the sub-carrier grid for the cells on carrier frequency F2. IC processing of known signals is known in the art and any known method may be used. The wireless terminal 50 then performs a cell search on the IC processed signal in order to detect the neighboring cell on carrier frequency F1 (block 175). Cell search may be based on prior art methods.

Example steps when the estimated signal on carrier frequency F2 is obtained in idle mode for inter-frequency interference mitigation purpose include:

1. Storing the received digital baseband signal in a buffer;
2. Playing back and digitally mixing the stored baseband signal to frequency align the baseband signal to the sub-carrier grid according to carrier frequency F2 (if F2 is the one that should be cancelled);
3. Perform estimation steps where the signal for the cell on carrier frequency F2 is estimated;
4. Digitally mixing the estimated signal to frequency align the estimated signal with the sub-carrier grid for carrier frequency F1;
5. Subtracting the frequency corrected signal from the stored baseband signal to determine an interference mitigated signal;
6. Further processing the interference mitigated signal in order to obtain a measurement or detect information received in the signal on carrier frequency F1.

Figure 7:
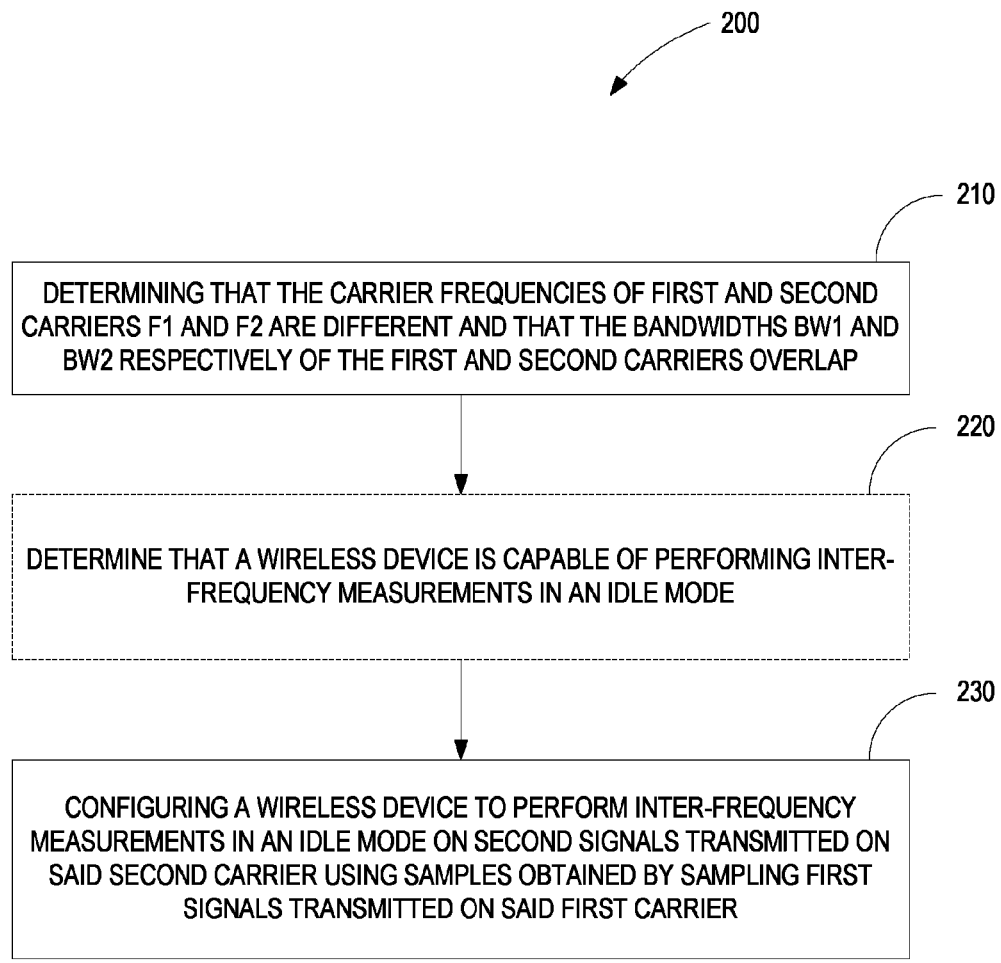
FIG. 7 illustrates a method implemented by a network node of configuring a wireless terminal to performing inter-frequency measurements.

FIG. 7 illustrates a method 200 implemented in a network node according to an embodiment of the invention. The network node may, for example, comprise an eNodeB, a coordinating node or control node configuring measurements, a positioning node, an MDT node, a SON node, an anchor node in an advanced heterogeneous, or small cell deployment.

The network node determines that carrier frequencies F1 and F2 transmitted by one or more network nodes are different, but bandwidth BW1 (associated with F1) and bandwidth BW2 (associated with carrier frequency F2) overlap, at least in part (block 210). The network node also determines that a wireless terminal is capable of performing inter-frequency measurements in idle mode on carrier frequency F2 using the intra-frequency base band signal on carrier frequency F1, or vice versa (block 220). This determination can be made based on signaling from another node or from the wireless terminal 50. For example, the wireless terminal 50 or other network may signal the capability of the wireless terminal 50 to perform inter-frequency measurements when bandwidths BW1 and BW2 overlap, or provide some indication related to its ability to perform inter-frequency measurements. The indication may be explicit or implicit. The network node then configures the wireless terminal 50 to perform inter-frequency measurement on carrier frequency F2 using samples of signals transmitted on carrier frequency F1, or vice versa (block 230).

Configuring the wireless terminal 50 to perform inter-frequency measurements may include one or more of the following steps:

Configuring (e.g., via broadcast, multicast, or dedicated signaling) the wireless terminal 50 with one or more inter-frequency measurements on carrier frequency F2 to be performed in idle mode (e.g., for logged MDT, positioning, RRM, SON, or other purpose), accounting for the device's capability, wherein the configuring may comprise, e.g., one or more of:
  Including carrier frequency F2 in a measurement configuration
  Indicating a specific type or purpose of the inter-frequency measurement
Configuring in the network node one or more timers associated with the inter-frequency measurements (e.g., since the measurement may be faster than inter-frequency with non-overlapping bandwidths the corresponding timer may also be configured for a shorter time) and/or inter-frequency mobility and/or carrier switching. In one exemplary embodiment, the timer may configured based on the measurement bandwidth on the second frequency, or the overlap in bandwidths of the first and second carriers.
Configuring the wireless terminal 50 to perform in idle mode signal measurements on parts of the bandwidth of an inter-frequency cell with a bandwidth overlapping with the bandwidth of a serving-frequency cell. The configuring may include configuring a measurement filter constant, scaling factors, measurement reporting (e.g. which part of the bandwidth the wireless terminal 50 have measured on or whether the measurement has been on a part of the bandwidth comprised in the overlapping part of bandwidths BW1 and BW2).
Providing the wireless terminal 50 with assistance data to assist it in performing inter-frequency measurements in idle mode on carrier frequency F2 when bandwidth BW2 overlaps, at least in part, with bandwidth BW1. The assistance data may be provided to the wireless terminal 50, e.g., pro-actively (e.g., prior it is entering the idle mode), via dedicated, multicast or broadcast channel. In another example, the assistance data may be read in idle mode, e.g., from system information or another multicast/broadcast channel. The assistance data may comprise, e.g., any one or more of:
  Frequency information related to carrier frequency F2;
  Timing information related to radio signal transmissions on carrier frequency F2;
  Frequency accuracy related to radio signal transmissions on carrier frequency F2;
  Frequency shift between the transmitter on carrier frequency F2 and the transmitter on carrier frequency F1;

Expected frequency shift or the maximum frequency shift at a receiver between signals on carrier frequency F2 and signals on carrier frequency F1;

Information or a set of indicators describing the part of the bandwidth BW2 for measurements on carrier frequency F2;

Receiver configuration (e.g., filter-related parameters).

These measurements may be configured for any or for a specific purpose, e.g., RRM, mobility, positioning, MDT, SON, interference coordination, channel estimation and feedback, etc.

The measurements may be collected over time and the network may then receive the measurements performed on a part of bandwidth BW2 when the wireless terminal 50 gets connection to the network. The measurements may be used by the network for any purpose, e.g., RRM, mobility, interference coordination, SON, antenna configuration optimization, network planning, etc.

Figure 8:
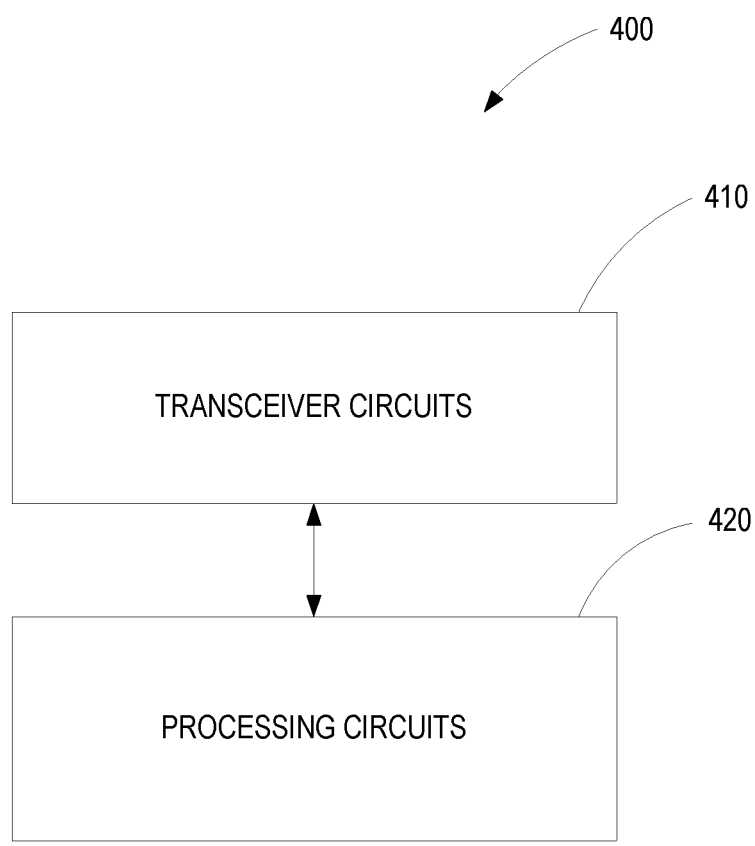
FIG. 8 illustrates the main functional elements of a wireless terminal.

FIG. 8 illustrates a wireless terminal 400 according to one or more embodiments. The wireless terminal 400 comprises transceiver circuits 410 for communicating with base stations 25 in a wireless communication network 10 and processing circuits 420 connected to said transceiver circuits. The transceiver circuits 410 may operate according to the LTE Release 10 standard, or other communication standard. The processing circuits 420 may comprise one or more processors, hardware, firmware, or a combination therefore. The processing circuits are configured to perform the methods and procedures implemented by the wireless terminal 50 herein described. In one exemplary embodiment, the processing circuits are configured to obtaining, during an IDLE mode, samples of first signals transmitted on a first carrier frequency having a first bandwidth. The processing circuits are further configured to determine that a second carrier frequency different from the first carrier frequency has a second bandwidth that overlaps with the first bandwidth of the first carrier frequency, and to perform, during the IDLE mode, inter-frequency measurements on one or more second signals transmitted on the second carrier frequency using the samples of the first signals transmitted on the first carrier frequency.

Figure 9:
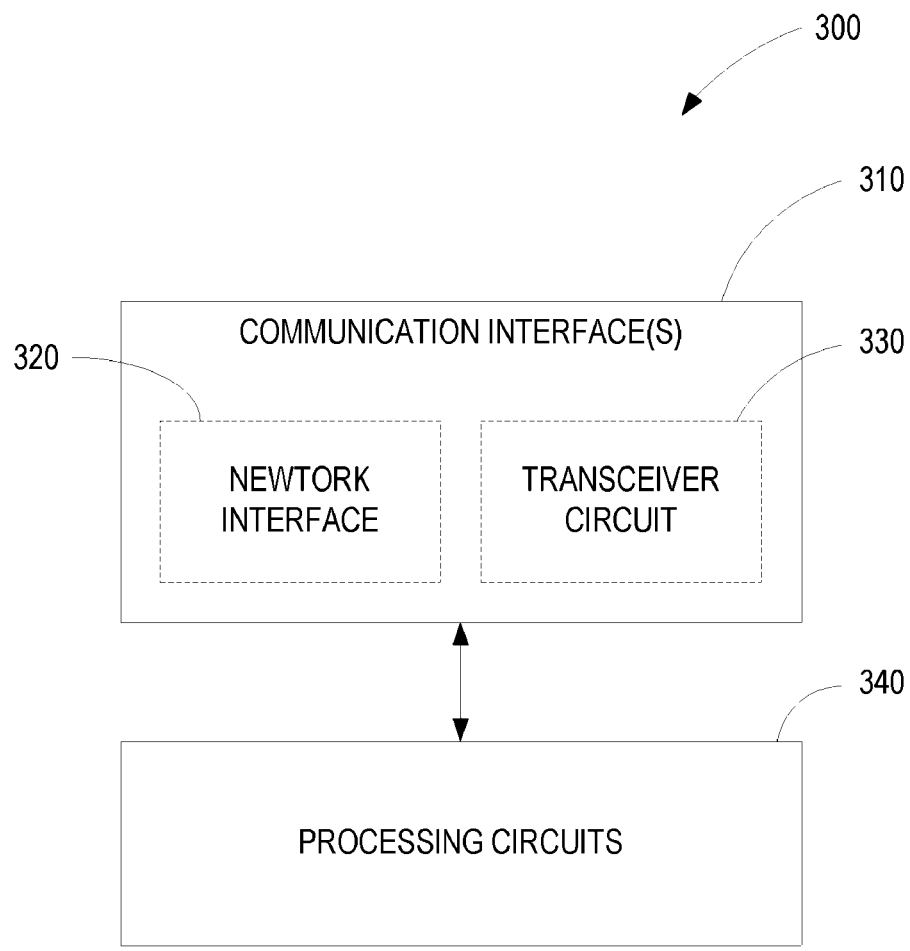
FIG. 9 illustrates the main functional elements of a network node.

FIG. 9 below illustrates an exemplary network node 300 configured to perform the methods as herein described. The network node 300 comprises one or more communication interfaces 310 for communicating with other network node and/or wireless terminals. In some embodiments, the network node 300 comprises a control node in a core network or RAN and the communication interfaces 310 comprises a network interface 320 for communicating with other network nodes, such a radio nodes and other control nodes. In some embodiments, the network node 300 comprises a radio node (e.g. base station) and the one or more communication interfaces 310 comprise a network interface 320 for communicating with other network nodes and a transceiver circuit 330 for communicating with wireless terminals 50. The transceiver circuits may operate according to the LTE Release 10 standard, or other communication standard. The network node 300 further includes one or more processing circuits 340 configured to perform the methods shown and described herein. The processing circuits 340 may comprise one or more processors, hardware, firmware, or a combination thereof. In one embodiment, the processing circuits 420 are configured to determine that the carrier frequencies of first and second carriers are different and that the bandwidths of the first and second carriers overlap, and to configure a wireless terminal 50 to perform inter-frequency measurements in an IDLE mode on second signals transmitted on said second carrier using samples obtained by sampling first signals transmitted on said first carrier.

What is claimed is:

1. A method, performed by a wireless terminal in a wireless communication network, the method comprising:

obtaining, during an idle mode, samples of first signals received on a first carrier frequency having a first bandwidth;

receiving one or more second signals transmitted on a second carrier frequency having a second bandwidth, the second carrier frequency different from the first carrier frequency;

determining the second bandwidth overlaps, at least in part, with the first bandwidth;

based on determining that the second bandwidth overlaps, at least in part, with the first bandwidth, performing, during the idle mode, inter-frequency measurements on the one or more second signals transmitted on the second carrier frequency using the samples of the first signals transmitted on the first carrier frequency; and sending, to a network node, a measurement report including inter-frequency measurements made on the second carrier frequency.

2. The method of claim 1, further comprising performing, during the idle mode, intra-frequency measurements on one or more of the first signals using the samples.

3. The method of claim 1, wherein the first carrier frequency is a serving carrier frequency.

4. The method of claim 1, wherein the measurement report indicates that the inter-frequency measurements span a portion only of the second bandwidth.

5. The method of claim 1, wherein the measurement report includes an indication of the portion of the second bandwidth on which the measurements where performed.

6. The method of claim 1, further comprising:

cancelling interference due to the second signals from the samples to obtain reduced interference samples; and performing the inter-frequency measurements on the first signals using the reduced interference samples.

7. The method of claim 6, wherein the cancelling interference due to the second signals from the samples to obtain reduced interference samples comprises:

estimating the second signals;

transforming the estimated second signal to corresponding signals on a frequency grid associated with the first carrier frequency;

subtracting the transformed signal from the received samples of the first signal.

8. The method of claim 1, further comprising:

cancelling interference due to the first signals from the samples to obtain reduced interference samples; and performing measurements on the second signals using the reduced interference samples.

9. The method of claim 1, further comprising performing frequency correction on the samples to adjust the samples to a frequency grid associated with the second carrier frequency.

10. The method of claim 1, further comprising signaling, to another network node, a capability of performing inter-frequency measurements for the second signals within a portion of the second bandwidth that overlaps with the first bandwidth.

11. The method of claim 1, further comprising adapting measurement parameters for the inter-frequency measurements.

12. The method of claim 11, wherein adapting measurement parameters for the inter-frequency measurements comprises at least one of:
adapting a bandwidth and/or filter length of a measurement filter;
scaling the estimated or measured parameter depending on the measurement bandwidth.

13. The method of claim 1, wherein the inter-frequency measurements in the measurement report are used for one or more of radio resource management (RRM), mobility, interference coordination, self-organizing network (SON), antenna configuration optimization, or network planning.

14. A wireless terminal comprising:
a transceiver circuit for communication with network nodes in a wireless communication network;
a processing circuit to process received signals received via the transceiver circuits, the processing circuit configured to:
obtain, during an idle mode, samples of first signals received on a first carrier frequency having a first bandwidth;
receive one or more second signals transmitted on a second carrier frequency having a second bandwidth, the second carrier frequency different from the first carrier frequency;
determine that the second bandwidth overlaps, at least in part, with the first bandwidth;
based on a determination that the second bandwidth overlaps, at least in part, with the first bandwidth, perform, during the idle mode, inter-frequency measurements on the one or more second signals transmitted on the second carrier frequency using the samples of the first signals transmitted on the first carrier frequency; and
send, to a network node, a measurement report including inter-frequency measurements made on the second carrier frequency.

15. The wireless terminal of claim 14, wherein the processing circuit is further configured to perform, during the idle mode, intra-frequency measurements on one or more of the first signals using the samples.

16. The wireless terminal of claim 14, wherein the processing circuit is further configured to:
cancel interference due to the second signals from the samples to obtain reduced interference samples; and
perform measurements on the first signals using the reduced interference samples.

17. The wireless terminal of claim 16, wherein the processing circuit is further configured to cancel interference due to the second signals from the samples to obtain reduced interference samples by:
estimating the second signals;
transforming the estimated second signal to corresponding signals on a frequency grid associated with the first carrier frequency;
subtracting the transformed signal from the received samples of the first signal.

18. The wireless terminal of claim 14, wherein the processing circuit is further configured to:
cancel interference due to the first signals from the samples to obtain reduced interference samples;
perform measurements on the second signals using the reduced interference samples.

19. The wireless terminal of claim 14, wherein the processing circuit is further configured to perform frequency correction on the samples to adjust the samples to a frequency grid associated with the second carrier frequency.

20. The wireless terminal of claim 14, wherein the processing circuit is further configured to signal, to another network node, a capability of performing inter-frequency measurements for the second signals within a portion of the second bandwidth that overlaps with the first bandwidth.

21. The wireless terminal of claim 14, wherein the processing circuit is further configured to adapt measurement parameters for the inter-frequency measurements by at least one of:
adapting a bandwidth and/or filter length of a measurement filter; and
scaling the estimated or measured parameter depending on the measurement bandwidth.

22. A method performed by a network node in a wireless communication network, the method comprising:
determining that carrier frequencies of first and second carriers transmitted by one or more network nodes are different and that the bandwidths of the first and second carriers overlap, at least in part;
based on determining that the bandwidths of the first and second carriers overlap, at least in part, configuring a wireless terminal to perform inter-frequency measurements in an idle mode on one or more second signals transmitted on the second carrier using samples obtained by sampling first signals transmitted on the first carrier; and
receiving, from the wireless terminal, a measurement report including inter-frequency measurements made on the second carrier frequency.

23. The method of claim 22, further comprising:
determining a capability of the wireless terminal to perform inter-frequency measurements on the second signals transmitted on the second carrier frequency; and
configuring the wireless terminal to perform the inter-frequency measurement based on the capability of the wireless terminal.

24. The method of claim 22, further comprising configuring the wireless terminal to cancel interference in the first signals caused by the second signals.

25. The method of claim 22, wherein the configuring comprises at least one of:
indicating to the wireless terminal a type of inter-frequency measurement to be performed on the second signals;
configuring, based on a measurement bandwidth for the second signals, a timer for the inter-frequency measurements;
configuring at least one of a measurement filter constant and scaling factor; and
configuring reporting of the measurement to the network node by the wireless terminal.

26. The method of claim 22, further comprising sending assistance data to the wireless terminal to facilitate the inter-frequency measurements.

27. The method of claim 26, wherein the assistance data comprises at least one of:
a carrier frequency of the second carrier;
timing information for radio signals transmitted on the second carrier;
frequency accuracy of radio signals transmitted on the second carrier;
a frequency shift between the first and second carriers at the transmitters;
a frequency shift between the first and second carriers at a receiver;
information describing the part of the second bandwidth on which measurements are to be performed; and a receiver configuration.

28. The method of claim 22, wherein:
the configuring comprises configuring the wireless terminal to perform the inter-frequency measurements for one or more of radio resource management (RRM), mobility, positioning, minimization of drive tests (MDT), self-organizing network (SON), interference coordination, or channel estimation and feedback; and
the method comprises using the inter-frequency measurements in the received measurement report for one or more of RRM, mobility, interference coordination, SON, antenna configuration optimization, or network planning.

29. A network node in a wireless communication network, the network node comprising:
a communication interface for communicating over the wireless communication network;
a processing circuit connected to the communication interface, the processing circuit configured to:
determine that the carrier frequencies of first and second carriers are different and that the bandwidths of the first and second carriers overlap, at least in part;
based on determining that the bandwidths of the first and second carriers overlap, at least in part, configure a wireless terminal in the wireless communication network to perform inter-frequency measurements in an idle mode on one or more second signals transmitted on the second carrier using samples obtained by sampling first signals transmitted on the first carrier; and
receive, from the wireless terminal, a measurement report including inter-frequency measurements made on the second carrier frequency.

30. The network node of claim 29, wherein the processing circuit is further configured to:
obtain a capability of the wireless terminal to perform inter-frequency measurements on the second signals transmitted on the second carrier frequency; and
configure the wireless terminal to perform the inter-frequency measurement based on the capability of the wireless terminal.

31. The network node of claim 29, wherein the processing circuit is further configured to cancel interference in the first signals caused by the second signals.

32. The network node of claim 29, wherein the processing circuit is further configured to send assistance data to the wireless terminal to facilitate the inter-frequency measurements.

* * * * *